United States Patent [19]

Talsma et al.

[11] 4,206,300

[45] Jun. 3, 1980

[54] METHOD FOR IMPROVING COLOR AND IMPACT STRENGTH OF NITRILE POLYMERS

[75] Inventors: Herbert Talsma, East Cleveland; Thomas J. Bond, Chardon; Daniel W. Feldman, Beachwood, all of Ohio

[73] Assignee: Standard Oil Company, Ohio

[21] Appl. No.: 914,270

[22] Filed: Jun. 12, 1978

[51] Int. Cl.$^2$ ............................ C08F 6/00; C08F 8/00
[52] U.S. Cl. .................................. 528/483; 528/502; 528/503
[58] Field of Search ...................... 528/483, 502, 503; 260/879, 880 R

[56] References Cited

U.S. PATENT DOCUMENTS

| | | | |
|---|---|---|---|
| 2,445,042 | 7/1948 | Silverman | 528/502 |
| 3,426,102 | 2/1969 | Solak et al. | 260/879 |
| 3,586,737 | 6/1971 | Duke et al. | 268/879 |
| 3,763,278 | 10/1973 | Griffith | 260/880 R |

*Primary Examiner*—Stanford M. Levin
*Attorney, Agent, or Firm*—David J. Untener; Herbert D. Knudsen; Larry W. Evans

[57] ABSTRACT

Reduction of yellowing and improvement of impact strength are obtained during the processing of nitrile polymers when said polymers are heated to a plastic state in the presence of an inert gas, thereby excluding oxygen.

8 Claims, No Drawings

METHOD FOR IMPROVING COLOR AND IMPACT STRENGTH OF NITRILE POLYMERS

BACKGROUND OF THE INVENTION

The invention relates to a method of processing nitrile polymers into articles. The polymer can be processed into various forms such as densified pellets (lens), or the final article of manufacture such as film sheets, pipe, bottles, or injection molded or blow molded articles.

Typically, the coagulated latex formed by a polymer reaction must be processed prior to its end use. This processing may consist of densification of the polymer strands into pellets, compounding or mixing the resin with various additives to improve certain physical properties, extrusion to pellet or final article, and injection blow molding.

Common to these processing steps is the heating of the polymer to a plastic state. It has been discovered that improved yellowness index and impact strength can be obtained by displacing oxygen with an inert gas during the heating and plasticizing step.

THE INVENTION

The invention is a method for improving the color and impact strength of a nitrile polymer produced by the polymerization of an olefinically unsaturated nitrile and a preformed rubber component said polymer having at least 50 weight percent of the nitrile, by heating the polymer to a plastic state in the absence of oxygen and in the presence of an inert gas. The invention has application in the densification of polymer strands, the making of an article of manufacture from the densified polymer, and in the making of an article of manufacture from the undensified polymer.

The dried coagulated latex formed by the polymer reaction is usually densified prior to its final use. This densification serves to improve certain physical qualities of the polymer, remove volatiles, and to provide the polymer in a form easy for later use. Such densification is usually accomplished in an extruder. Strands of latex are fed to a screw or other type of extruder. Either external heat or the heat of conduction from the screw or cylinder is applied to obtain the degree of plasticity required for extrusion. Such densification usually results in the formation of pellets or lenses.

The densified pellets can then be used in the forming of a final article of manufacture. These articles can be sheets, pipes, bottles and the like. During this stage, heat is again applied to the pellets to form a plastic state. This plasticized polymer is then processed by extrusion or injection blow molding into its final form. It is also possible to go directly from the strands of latex to the final article of manufacture without the intermediate densification step.

In the prior art, during the heating and plasticizing of the strands or pellets, air is entrained in the polymer. As the polymer plasticizes with rising temperature, it becomes more tightly packed and the air is forced out.

It has been discovered, however, that the oxygen in the air attacks the polymer causing adverse physical effects. By displacing the oxygen with an inert gas during the heating and plasticizing step, properties of the polymer such as the yellowness index and impact strength are greatly improved. Also, the same quality of polymer as found in the prior art can be maintained with dramatic increases in production.

The inert gas used to displace the oxygen during this processing step can be any gas inert to the polymer. Preferred gases are nitrogen and carbon dioxide.

The nitrile polymers to which this invention pertains include those resinous polymers and interpolymers produced by polymerizing a major proportion of a mono-unsaturated nitrile, such as acrylonitrile, and a minor proportion of another monovinyl monomer component copolymerizable with said nitrile in an aqueous medium, and optionally said copolymerization is carried out in the presence of a preformed diene rubber which may be a homopolymer or a copolymer of a conjugated diene monomer.

The olefinically unsaturated nitriles useful in the present invention are the alpha, beta-olefinically unsaturated mononitriles having the structure

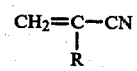

wherein R is hydrogen, a lower alkyl group having from 1 to 4 carbon atoms, or a halogen. Such compounds include acrylonitrile, alphachloroacrylonitrile, alphafluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which are useful in this invention includes one or more of the esters of olefinically unsaturated carboxylic acids, vinyl esters, vinyl ethers, alpha-olefins, vinyl aromatic monomers, and others.

The esters of olefinically unsaturated carboxylic acids include those having the structure

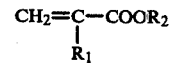

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alphachloroacrylate, and the like. Most preferred in the present invention are those having at least 4 and as many as 10 carbon atoms and having the structure

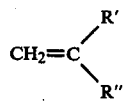

wherein R' and R" are alkyl groups having from 1 to 7 carbon atoms, and more specifically preferred are alpha-olefins such as isobutylene, 2-methyl butene-1, 2-methyl pentene-1,2-methyl hexene-1,2-methyl heptene- 1,2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred in vinyl acetate.

The vinyl aromatic monomers include styrene, alpha-methyl styrene, the vinyl toluenes, the vinyl xylenes, isopropyl styrenes, and the like, such as o-, m-, and p-isopropyl styrenes, and mixtures of the same. The most preferred vinyl aromatic is styrene.

The conjugated diene monomers useful in the present invention include butadiene-1,3, isoprene, chloroprene, bromoprene, cyanoprene, 2,3-dimethyl-butadiene-1,3, 2-ethyl butadiene-1,3, 2,3-diethylbutadiene-1,3, and the like. Most preferred for the purpose of this invention are butadiene and isoprene because of their ready availability and their excellent copolymerization properties.

Polymerizates of particular utility in this invention and details of their method of preparation are described in U.S. Pat. Nos. 3,426,102, 3,586,737 and 3,763,278.

The polymerizates useful in the process of this invention are those prepared by the polymerization of 100 parts by weight of (A) at least 50% by weight of at least one nitrile having the structure

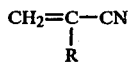

wherein R has the foregoing designation and (B) up to 50% by weight based on the combined weight of (A) and (B) of at least one member selected from the group consisting of (1) an ester having the structure

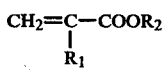

wherein $R_1$ and $R_2$ have the foregoing respective designations, (2) an alpha-olefin having the structure

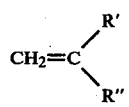

wherein R' and R" have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene and a nitrile monomer having the structure

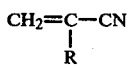

wherein R has the foregoing designation, said rubbery polymer containing from 50 to 100% by weight of polymerized conjugated diene and from 0 to 50% by weight of comonomer.

Preferably, component (A) should be present in from about 60 to 90% by weight based on the combined weight of (A) and (B) and the rubbery polymer (C) should contain more than 50% by weight of conjugated diene and more preferably from 60% to 90% by weight of the conjugated diene.

The polymeric compositions of the present invention can be prepared by any of the known general techniques of polymerization including the bulk polymerization, solution polymerization and emulsion or suspension polymerization techniques, by batch, continuous or intermittent addition of the monomers and other components. The polymerization is preferably carried out by means of aqueous emulsion or suspension techniques in the presence of an emulsifer, molecular weight modifier, and a free-radical generating polymerization initiator at a temperature of from about 0° to 100° C. in the substantial absence of molecular oxygen. It is also preferred that the monomers be copolymerized in the presence of an emulsion or suspension of the preformed rubber. The product of the aqueous emulsion polymerization is usually in the form of a latex, and the copolymers may be recovered from the latex by any suitable means such as by coagulation with electrolytes or solvents, by freezing, or the like.

The physical properties improved by the present invention are impact strength and yellowness index. Impact strength of a resin can be determined by the notched Izod test, found in ASTM D256, "Impact Resistance of Plastics and Electrical Insulating Materials." The value given is in foot lb./inch notch. The higher the value, the greater impact strength of the polymer.

The yellowness index of plastics can be determined by using ASTM D 1925-70, "Yellowness Index of Plastics." The lower the index number, the less yellowness found in the polymer.

Other physical properties associated with such resins are percent haze and percent transmission. These values can be determined by using ASTM D1003, "Standard Method for Haze and Luminous Transmittance of Transparent Plastics."

The following examples further illustrate the invention.

EXAMPLE 1

An acrylonitrile-rubber latex was prepared using the methods found in U.S. Pat. Nos. 3,426,102 and 3,586,737. The polymer was recovered from the latex by coagulation and formed into strands.

A screw extruder was used to densify and pelletize the strands. The extruder screw consisted of two stages. The screw was run at a speed of 100 rpm. The pellets were collected and made into plaques by both the direct compression (D.C.) and the mill and mold (M.M.) techniques. The plaques were tested for yellowness index, transmission and haze, with the mill and mold plaques also being tested for Izod impact.

EXAMPLE 2

To show the effectiveness of a nitrogen purge, a ⅜ inch O.D. tube was inserted into the throat of the feed section of the extruder. Using the same strands, the extruder and screw rate of Example 1, nitrogen was fed through the tube at 21 psi for 8 minutes to flush air prior to pelletizing. The nitrogen flow continued while pellets were collected. The pellets were then formed into plaques and tested as in Example 1.

EXAMPLE 3

Example 2 was repeated with carbon dioxide replacing nitrogen as the purge. Carbon dioxide was fed through the tube at 33 psi for 8 minutes to flush air, and the flow continued during pellet collection. The pellets were then collected, formed into plaques and tested as in Example 1.

Table I shows the beneficial effects of eliminating oxygen during the heating and plasticizing process step. "D.C." and "M.M." refers to direct compression and mill and mold respectively.

As can be seen, the present invention greatly improves the physical properties of the pellets. An important improvement shown in the Table is a gain in light transmission of from 2 to 3% when using the present invention. In situations where the strands must be tinted to specific colors, a larger gain of percent transmission is observed and less tint needs to be added to compensate for previous yellowness.

Using the same nitrile polymer strands, pellets were formed in the presence of air and in the presence of nitrogen. The pellets were then formed into a 20 oz. bottle to determine drop height. The bottle produced using the polymer pelletized in the presence of air showed a drop height of 6.1 ft. The bottle formed from the polymer pelletized in the presence of nitrogen showed a significant increase in drop height to 11.5 ft.

An added benefit to using the present invention is increased production. It has been found that when using the same extruder for densification, the use of a nitrogen purge allows the densification rate to be increased by 20% and still maintain acceptable yellowness and Izod numbers.

TABLE I

IMPROVEMENT OF POLYMER PROPERTIES USING INERT GAS

| EXAMPLE | PURGE | Izod Ft. lbs/in notch MM | Yellowness Index | | Transmission % | | Haze % | |
|---|---|---|---|---|---|---|---|---|
| | | | D.C. | M.M. | D.C. | M.M. | D.C. | M.M. |
| 1 | None | 1.93 | 21.4 | 34.9 | 84.4 | 79.7 | 13.7 | 8.3 |
| 2 | $N_2$ | 1.93 | 13.4 | 29.6 | 86.7 | 81.8 | 15.7 | 9.0 |
| 3 | $CO_2$ | 2.57 | 12.7 | 28.0 | 88.0 | 82.9 | 11.9 | 7.7 |

We claim:

1. A method for improving the color and impact strength of a nitrile polymer produced by the polymerization of an olefinically unsaturated nitrile and a preformed rubber component, said polymer having at least 50 weight percent of the nitrile, by heating the polymer to a plastic state in the absence of oxygen and in the presence of an inert gas.

2. The method of claim 1 wherein the inert gas is selected from the group consisting of nitrogen and carbon dioxide.

3. The method of claim 1 wherein the nitrile is acrylonitrile.

4. The method of claim 3 wherein the polymer, prior to being heated, is in the form of strands.

5. The method of claim 3 wherein the polymer, prior to being heated, is in the form of densified pellets.

6. The method of claim 1 wherein the polymer after being heated to a plastic state in the absence of oxygen and in the presence of an inert gas, is formed into an article.

7. The method of claim 6 wherein said article is densified pellets.

8. The method of claim 6 wherein said article is a final article of manufacture.

* * * * *